J. PINKHAM.
Nut-Locks.

No. 199,099. Patented Jan. 8, 1878.

Witnesses:
Grenville Lewis
J. McKenny

Inventor
Joseph Pinkham
By Hill, Ellsworth & Spear
By His Atty

UNITED STATES PATENT OFFICE.

JOSEPH PINKHAM, OF NEW MARKET, NEW HAMPSHIRE.

IMPROVEMENT IN NUT-LOCKS.

Specification forming part of Letters Patent No. 199,099, dated January 8, 1878; application filed September 12, 1876.

*To all whom it may concern:*

Be it known that I, JOSEPH PINKHAM, of New Market, in the county of Rockingham and State of New Hampshire, have invented a new and Improved Nut-Lock; and I do hereby declare the following to be a full, clear, and exact description of the same, reference being had to the accompanying drawings, forming part of this specification, in which—

Figure 3:
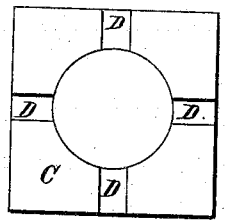
Figure 1:
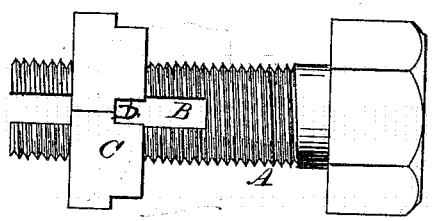
Figure 4:
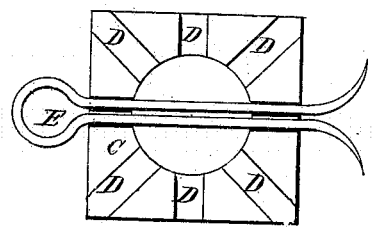
Figure 2:
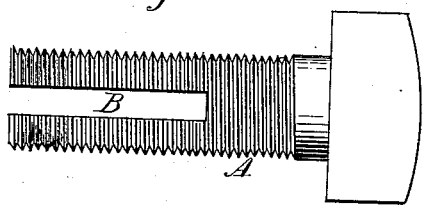
Figure 5:
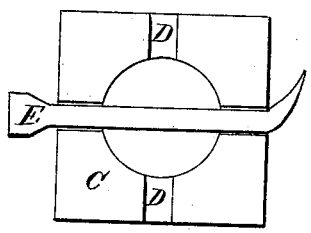

Figure 1 is a side elevation of a bolt and nut, showing my improvements. Fig. 2 is a side elevation of the bolt; and Figs. 3, 4, and 5 are plan views of the nuts and fastening-keys.

Similar letters of reference denote the same parts in the several figures of the drawings.

My invention has for its object to improve the means of preventing nuts from turning upon their bolts; and to this end it consists in constructing the bolt with a longitudinal slot, and the nut with one or more transverse recesses in its under face, so that when the nut is screwed upon the bolt, and a key or pin passed through the slot and one or the other of the recesses, the nut will be securely locked against turning at any point upon the bolt.

In the accompanying drawings, A is a screw-threaded bolt, constructed with a longitudinal slot, B, in the shank; and C is the nut, formed or provided with transverse grooves D D, to coincide with the bolt-hole. The nut is applied to the bolt in the usual manner, and when set up to the desired point is locked in place by passing a key, E, through one set of the recesses or grooves D, and through the slot in the bolt.

Inasmuch as the bolt is slotted for a considerable distance, the nut has a range of adjustment sufficient to adapt the invention for use when the nut is at the point of the bolt or near its head, according to the thickness of the material to which the bolt is applied.

This method of locking may be used with a nut having any desired number of sides; but there should be as many grooves as there are sides to insure nicety of adjustment.

The bolt may also be formed with more than one slot, in which case the nut need not be provided with as many grooves. This, however, is a matter of preference, the invention consisting essentially in the slotted bolt, and the grooved nut locked thereto by a key in recesses in the under face of the nut, irrespective of the number of slots in the bolt or the number of recesses in the nut.

Having thus described my invention, what I claim is—

The nut-lock, consisting of the bolt A, slotted longitudinally, the nut C, having the transverse grooves in its under surface, and the locking-key E, substantially as described, for the purpose specified.

JOSEPH PINKHAM.

Witnesses:
WILLIAM B. SMALL,
FRANK HERBERT PINKHAM.